United States Patent [19]

Somers

[11] 4,140,219

[45] Feb. 20, 1979

[54] PROTECTIVE STORAGE CASE FOR TAPE CASSETTES

[76] Inventor: Stanley B. L. Somers, 5 Quai du Mont-Blanc, 1201 Genèva, Switzerland

[21] Appl. No.: 789,989

[22] Filed: Apr. 22, 1977

[30] Foreign Application Priority Data

Apr. 22, 1976 [CH] Switzerland .................. 5087/76

[51] Int. Cl.² .................................. B65D 85/672
[52] U.S. Cl. .................................. 206/387; 206/493; 242/55.53
[58] Field of Search .................. 206/316, 387, 493; 242/55.3, 55.53; D87/1

[56] References Cited

U.S. PATENT DOCUMENTS

| 2,904,274 | 9/1959 | Hicks | 242/55.3 |
| 3,467,456 | 9/1969 | Chmela | 242/55.53 X |
| 3,664,492 | 5/1972 | Wallace | 206/387 |
| 4,030,601 | 6/1977 | Ackeret | 206/387 |
| 4,067,629 | 1/1978 | Amatsu | 206/387 X |

FOREIGN PATENT DOCUMENTS 2541997  4/1976  Fed. Rep. of Germany .......... 206/387

*Primary Examiner*—Steven E. Lipman
*Attorney, Agent, or Firm*—Young & Thompson

[57] ABSTRACT

A protective storage case for tape cassettes or other spooled tapes is formed by a rectangular parallelepipedic box with two perpendicular open edge faces adapted to be opened or closed by a pivoting flap member which carries protuberances on resilient integral tongues, these protuberances serving to elastically grip the cassette and prevent it from falling out when the flap member is opened and closed.

7 Claims, 3 Drawing Figures

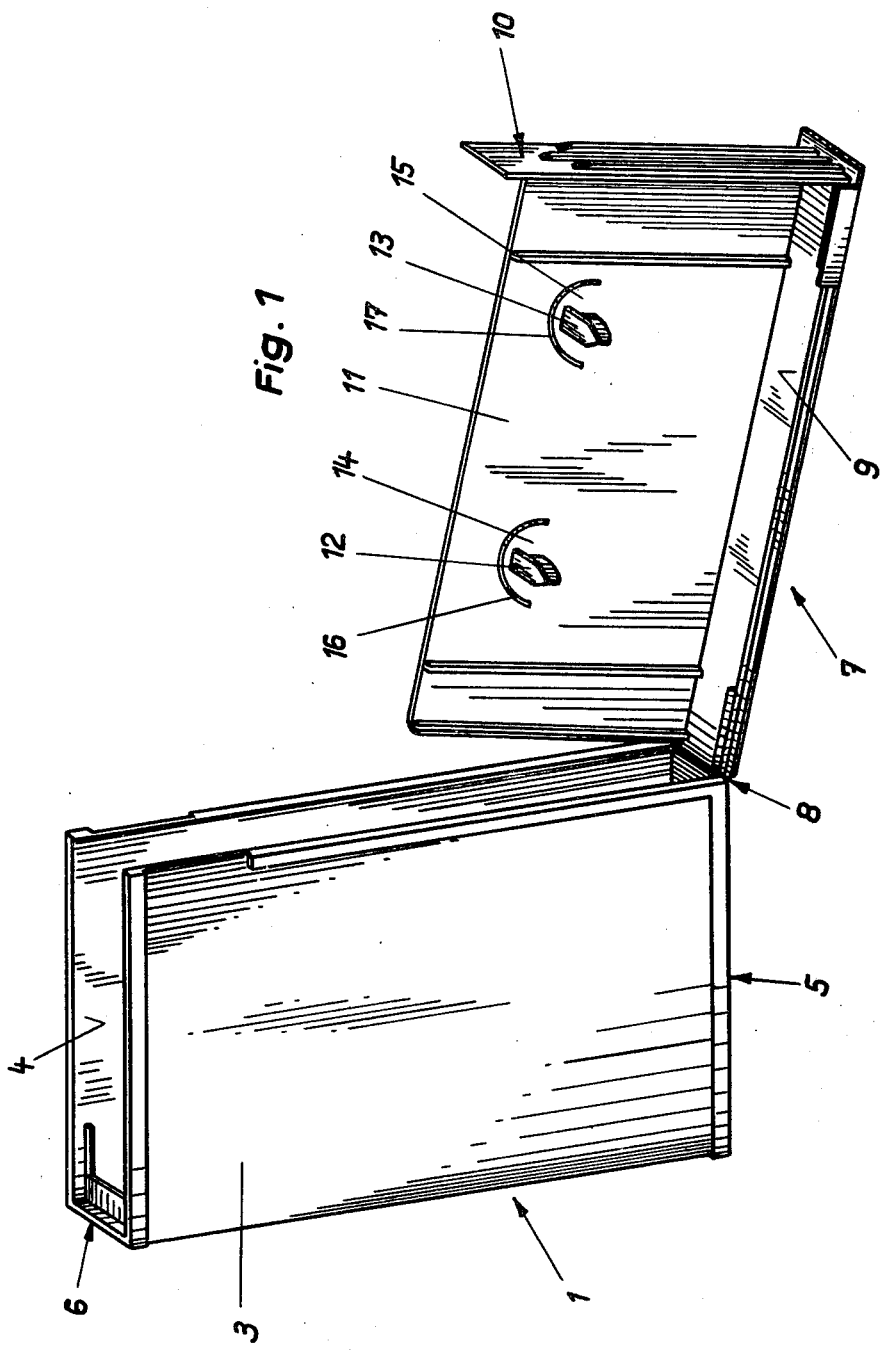

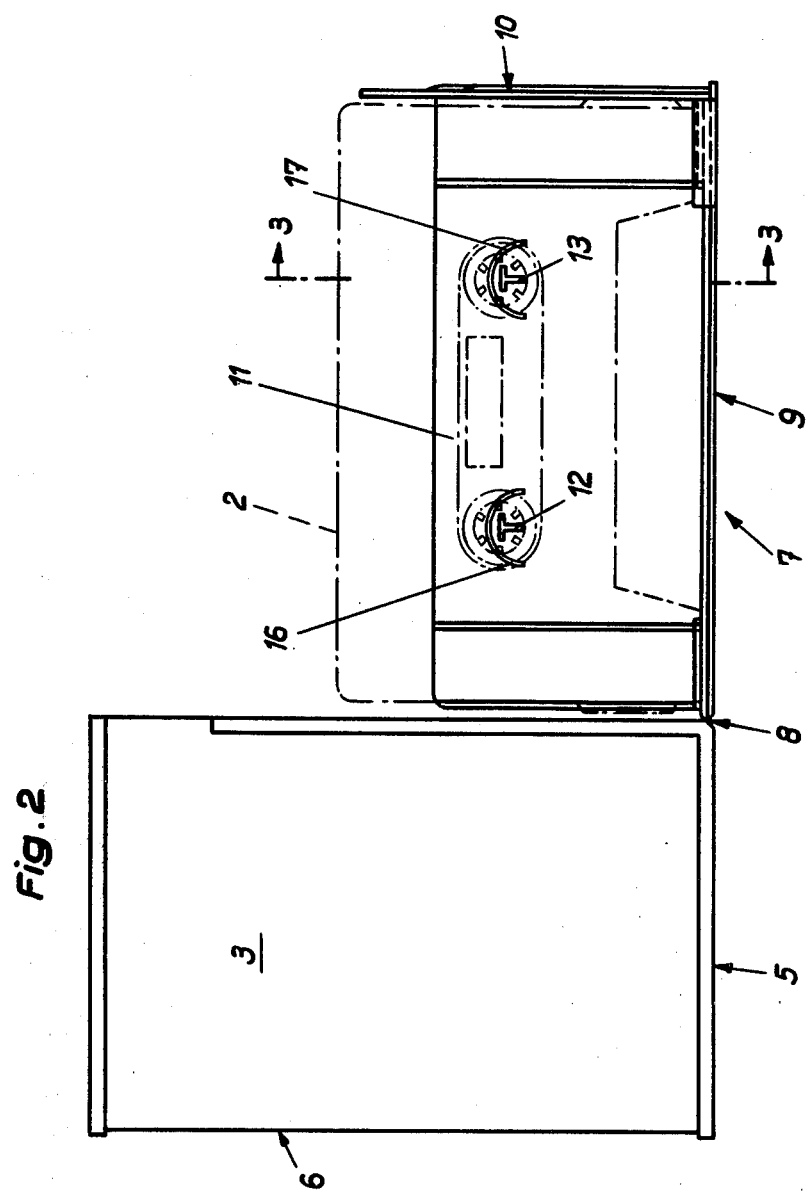

PROTECTIVE STORAGE CASE FOR TAPE CASSETTES

The invention relates to protective storage cases for spooled magnetic tapes and cinematographic films and their supports, notably cassettes or spools, and which will hereinafter all be referred to as "spooled tapes".

A known protective storage case for a spooled tape comprises a hollow generally parallelepipedic flat box dimensioned to enclose a spooled tape, said box having two main parallel spaced-apart generally rectangular faces connected along two perpendicular edges thereof by two mutually perpendicular first walls and having open edge faces along at least a part of the other two perpendicular edges thereof, a flap member including two mutually perpendicular second walls corresponding to the open edge faces of the box, said second walls being connected together by a third wall disposed parallel to the main faces of the box, and hinge means connecting the box and flap member for movement between a first position in which said second walls close the open edge faces of the box and a second position in which a spooled tape can be placed on and removed from said flap member.

In known cases of this type, the flap member may have one or more protuberances for preventing rotation of a stored spooled tape, but the spooled tape is not held on the flap member and may fall out when the flap member is opened.

The invention aims to remedy this disadvantage, and the case according to the invention is characterized in that it comprises elastic means for retaining the support of a spooled tape on the flap member.

The accompanying drawings show, by way of example, an embodiment of a protective storage case for a tape cassette having two hubs. In the drawings:

FIG. 1 is a perspective view of the case in an open position;

FIG. 2 is a side elevational view of the open case, with a cassette shown in chain lines; and FIG. 3 is a cross-section along line 3—3 of FIG. 2.

The protective storage case shown comprises a hollow generally parallelepipedic flat box 1, preferably of polystyrene, dimensioned to enclose a two-hubbed tape cassette 2 shown in chain lines in FIGS. 2 and 3. The box 1 has two main parallel spaced-apart faces 3 and 4 connected along two perpendicular edges thereof by walls 5 and 6 which are mutually perpendicular and perpendicular to the planes of faces 3 and 4. The two other perpendicular faces of the box are open. A flap member 7, preferably of polypropylene, is hinged to the box 1 by a hinge 8 which may be moulded integrally with the box as a flexible part which is thinner than the walls of the box. The flap member 7 has two mutually perpendicular walls 9 and 10 corresponding to respective open faces of the box and connected by a third wall 11 disposed parallel to the faces 3 and 4 of the box. Two protuberances 12 and 13 of T-section are each integral with a respective elastic tongue 14, 15 made integrally with the wall 11 of flap member 7. To this end, each tongue 14, 15 is formed by a substantially semi-circular arcuate slot 16, 17 in the wall 11. As a variation, the slot or cut-out forming each tongue could be an elongate opening of another shape, e.g. part of a triangle or rectangle.

As shown in FIGS. 2 and 3, the cassette 2 is retained on the flap member 7 by the protuberances 12, 13 coming to engage by the edge corresponding to the bottom or foot of each T-section with the corresponding hubs of the cassette. The elasticity of each protuberance applies it against the edge of the cassette coaxial with the hub in which it engages, and grips the cassette casing elastically by friction. In the instance of a spool, the projection cooperates directly with the spool hub. Each projection may have a retaining notch (not shown) which elastically hooks on the corresponding hub of the cassette.

Although the described protective storage case is for a two-hubbed cassette, in a variation, the flap member 7 could be provided with only a single elastic protuberance adapted to engage with the hub of a spool for example. This single protuberance could have a notch for retaining the spool, or could be as shown in FIG. 3 so that it grips the spool by friction.

The described protective storage case has the advantage that it can be opened and closed without the stored cassette or other spooled tape falling off of the flap member on which it is gripped elastically.

What is claimed is:

1. In a protective storage case for a spooled tape carried by a support including at least one hub, comprising a hollow generally parallelepipedic flat box enclosing a spooled tape, said box having two main parallel spaced-apart generally rectangular faces connected along two perpendicular edges thereof by two mutually perpendicular first walls and having open edge faces along at least a part of the other two perpendicular edges thereof, a flap member including two mutually perpendicular second walls corresponding to the open edge faces of the box, said second walls being connected together by a third wall disposed parallel to the main faces of the box, the side of said flap member opposite said third wall being open, and hinge means connecting the box and the flap member for movement between a first position in which said second walls close the open edge faces of the box and a second position in which a spooled tape can be placed on and removed from said flap member, the improvement comprising means elastically retaining the support of said spooled tape on the flap member, said elastic retaining means comprising at least one protuberance mounted elastically on the flap member and offset from the center of said hub in the direction of one of said second walls and in yieldable engagement with said hub to grip said support releasably between said protuberance and said one second wall.

2. Case according to claim 1, in which the protuberance retains said hub by friction.

3. Case according to claim 1, in which said protuberance has a notch for retaining the support of a spooled tape.

4. Case according to claim 1, in which said protuberance is integral with an elastic tongue integral with the third wall of the flap member.

5. Case according to claim 4, in which the tongue is defined by an elongated opening in the third wall of the flap member.

6. Case according to claim 5, in which said elongated opening is an arcuate slot.

7. Case according to claim 4, in which the tongue extends in a direction perpendicular to said one second wall.

* * * * *